United States Patent
Lin et al.

(10) Patent No.: US 9,233,583 B2
(45) Date of Patent: Jan. 12, 2016

(54) TIRE APPARATUS

(71) Applicant: The Goodyear Tire & Rubber Company, Akron, OH (US)

(72) Inventors: Cheng-Hsiung Lin, Hudson, OH (US); Michael Joseph Durr, Strongsville, OH (US); Arun Kumar Byatarayanapura Gopala, Copley, OH (US); Dale Roy Norton, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 184 days.

(21) Appl. No.: 14/103,190

(22) Filed: Dec. 11, 2013

(65) Prior Publication Data
US 2015/0158354 A1    Jun. 11, 2015

(51) Int. Cl.
| | |
|---|---|
| *B21D 53/26* | (2006.01) |
| *B21K 1/38* | (2006.01) |
| *B60C 25/00* | (2006.01) |
| *B29D 30/72* | (2006.01) |
| *B60C 23/12* | (2006.01) |
| *B29D 30/00* | (2006.01) |

(52) U.S. Cl.
CPC ............ *B60C 25/00* (2013.01); *B29D 30/0061* (2013.01); *B29D 30/72* (2013.01); *B60C 23/12* (2013.01); *B29D 2030/0077* (2013.01); *B29D 2030/0083* (2013.01); *B29D 2030/0094* (2013.01); *Y10T 29/4998* (2015.01); *Y10T 29/49538* (2015.01); *Y10T 29/49885* (2015.01)

(58) Field of Classification Search
CPC ............ B60C 25/00; B60C 25/0509; B29D 2030/0077; B29D 2030/0083; Y10T 29/49885; Y10T 29/4998; Y10T 29/49538
See application file for complete search history.

(56) References Cited

U.S. PATENT DOCUMENTS

| | | | |
|---|---|---|---|
| 2,802,512 A |   | 8/1957 | Rouse |
| 3,232,816 A |   | 2/1966 | Fields |
| 3,380,115 A | * | 4/1968 | Soderquist ............... 425/38 |
| 3,392,071 A |   | 7/1968 | McGarthwaite et al. |
| 3,825,965 A | * | 7/1974 | Root et al. ............... 15/88.3 |
| 4,051,881 A | * | 10/1977 | Peterson ............... 425/53 |
| RE31,273 E | * | 6/1983 | Peterson ............... 157/1.1 |
| 4,621,671 A | * | 11/1986 | Kane et al. ............... 157/1.1 |
| 5,095,744 A | * | 3/1992 | Macecek et al. ............... 73/146 |
| 5,573,625 A | * | 11/1996 | Lovell et al. ............... 156/356 |
| 6,615,649 B1 | * | 9/2003 | Kokubu et al. ............... 73/146 |
| 7,044,188 B2 | * | 5/2006 | Pellerin et al. ............... 157/1.17 |
| 7,584,775 B2 | * | 9/2009 | Nomura ............... 157/1.17 |
| 7,740,788 B2 | * | 6/2010 | Yoshino et al. ............... 264/326 |
| 8,442,670 B2 | * | 5/2013 | Chebli et al. ............... 700/215 |
| 8,567,453 B2 | * | 10/2013 | Donnay et al. ............... 141/38 |

(Continued)

FOREIGN PATENT DOCUMENTS

GB        988486 A        4/1965

OTHER PUBLICATIONS

European Search Report for Application Serial No. 14196684.

*Primary Examiner* — Essama Omgba
(74) *Attorney, Agent, or Firm* — June E. Rickey

(57) ABSTRACT

A tire support apparatus includes a support plate for receiving a tire includes an optional inflatable inner tube for insertion into the tire cavity, and an upper plate having a hole for receiving a support member, the upper plate further includes a ring having an inner lip that seats against the bead region of the tire and a radially outer surface that seats against the lower sidewall region of the tire T.

7 Claims, 12 Drawing Sheets

(56) References Cited

U.S. PATENT DOCUMENTS

| | | | |
|---|---|---|---|
| 8,596,322 B2* | 12/2013 | Stoila et al. | 156/394.1 |
| 8,991,466 B2* | 3/2015 | Lawson et al. | 157/1.21 |
| 2007/0137036 A1* | 6/2007 | Jeon | 29/894 |
| 2007/0170620 A1* | 7/2007 | Yoshino et al. | 264/326 |
| 2010/0163189 A1* | 7/2010 | Lawson et al. | 157/1.22 |
| 2010/0243127 A1* | 9/2010 | Chebli et al. | 156/64 |
| 2012/0145329 A1* | 6/2012 | Stoila et al. | 156/394.1 |
| 2013/0168029 A1* | 7/2013 | Lawson et al. | 157/1.17 |
| 2013/0168030 A1* | 7/2013 | Lawson et al. | 157/1.17 |
| 2013/0168032 A1* | 7/2013 | Lawson et al. | 157/1.17 |

* cited by examiner

TIRE APPARATUS

This invention was made with Government support under contract number DE-EE0005447 awarded by DOE. The Government has certain rights in the invention.

FIELD OF THE INVENTION

The invention relates to the field of manufacturing, and more particularly to tire manufacturing.

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will maintain correct air pressure within the tire without a need for driver intervention to compensate for any reduction in tire pressure over time. The components of the air maintenance feature must be installed and secured to the tire. Thus a tire apparatus is needed which can allow for the easy installation of the air maintenance assembly into the tire.

SUMMARY OF THE INVENTION

The invention provides in a first aspect a tire support apparatus for installing components into a tire, the tire support apparatus comprising: a support plate for receiving the tire thereon; an inflatable inner tube; an upper plate having a hole for receiving a support member, said upper plate further including a ring having an inner lip that seats against the bead region of the tire and a radially outer surface seats against the lower sidewall region of the tire T.

DEFINITIONS

"Aspect Ratio" means the ratio of a tire's section height to its section width.

"Axial" and "axially" mean the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

BRIEF DESCRIPTION OF THE DRAWINGS

The invention will be described by way of example and with reference to the accompanying drawings in which.

DETAILED DESCRIPTION OF THE INVENTION

FIGS. 1 through 7 illustrate a tire apparatus 100 useful for supporting a tire, and inserting one or more components into the tire. The tire is preferably cured, although the invention may be useful for insertion of the components into an uncured tire. The components may be applicable to a self inflating tire assembly or may be applicable to other applications, such as a tire pressure monitoring system. After the components are installed in the tire, the tire apparatus 100 provides a curing station to cover the exposed installation area with green rubber, and then cure the installation area.

Figure 1:
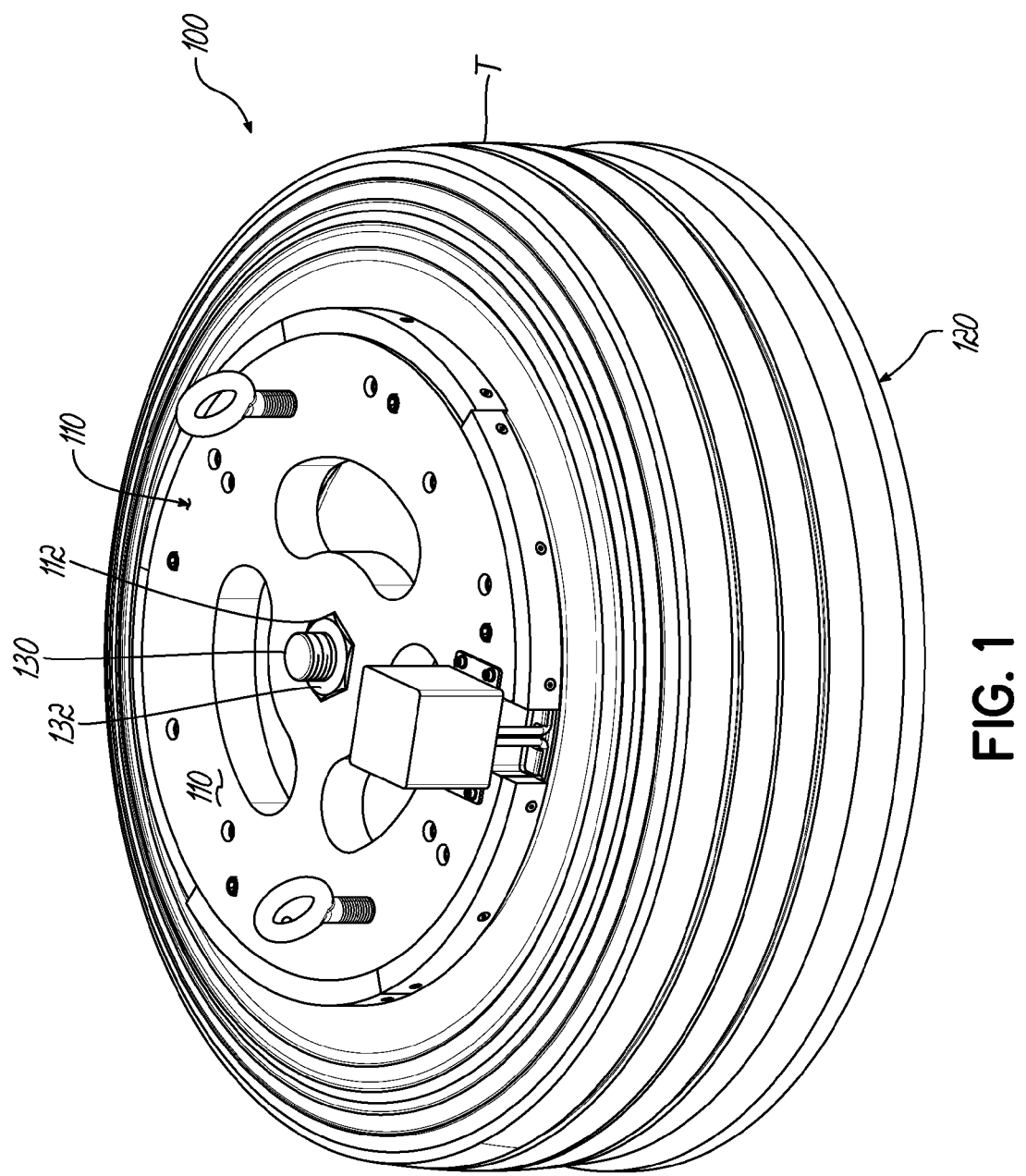
FIG. 1 is a perspective view of a tire mounted in a tire apparatus of the present invention.

FIG. 1 illustrates the tire apparatus 100 having a tire T installed in the assembly. The tire T is received between a first plate 110 and a support plate 120. A support member 130 such as a bolt is received in aligned holes 122, 112 of the support plate 120, and the first plate 110, respectively. The support member 130 secures the support plate 120, truck tire T and the upper plate together. A nut 132 is received on the end of the support member 130.

Figure 2:
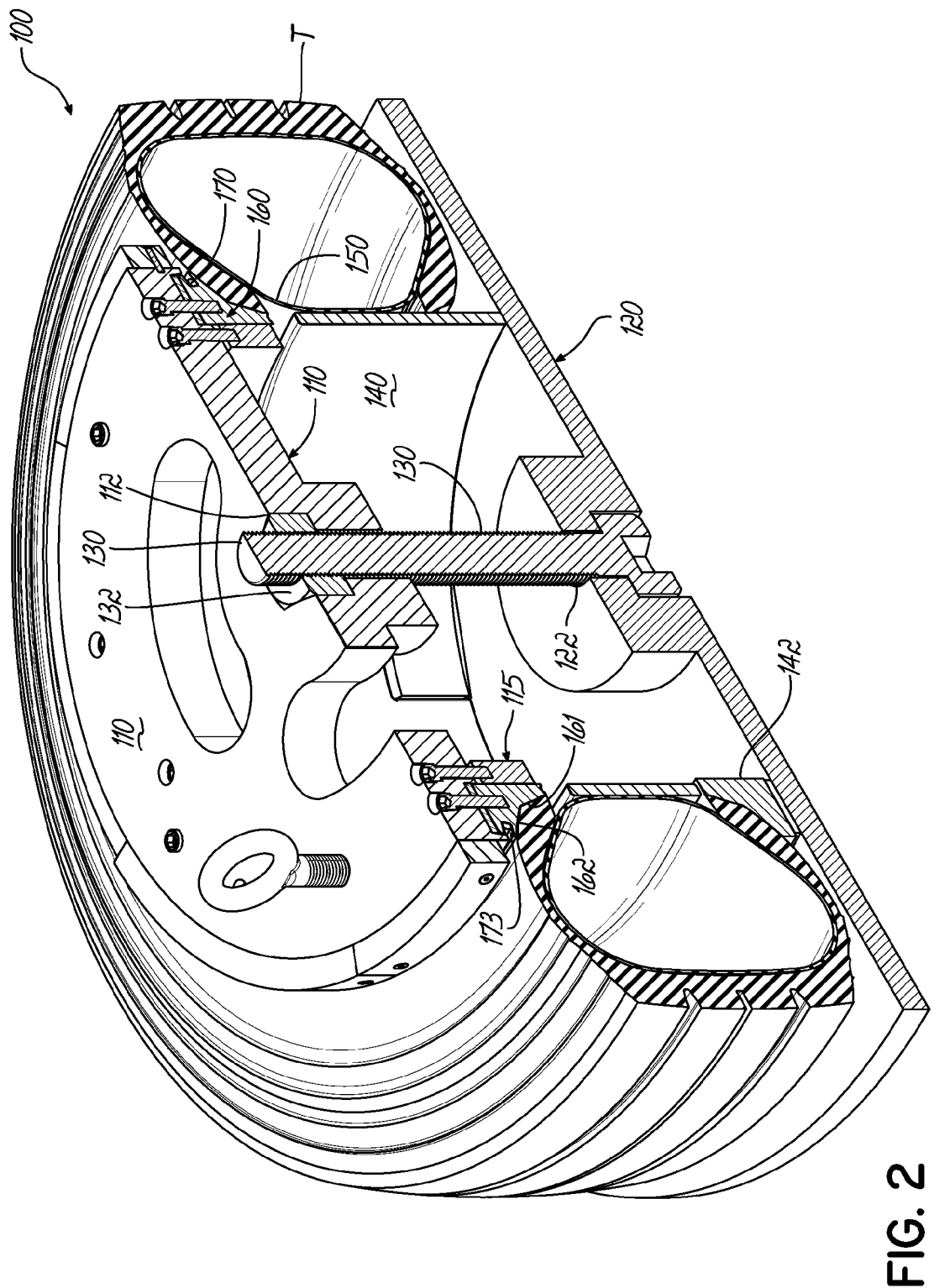
FIG. 2 is a cutaway perspective view of the tire and tire apparatus of FIG. 1.
Figure 3:
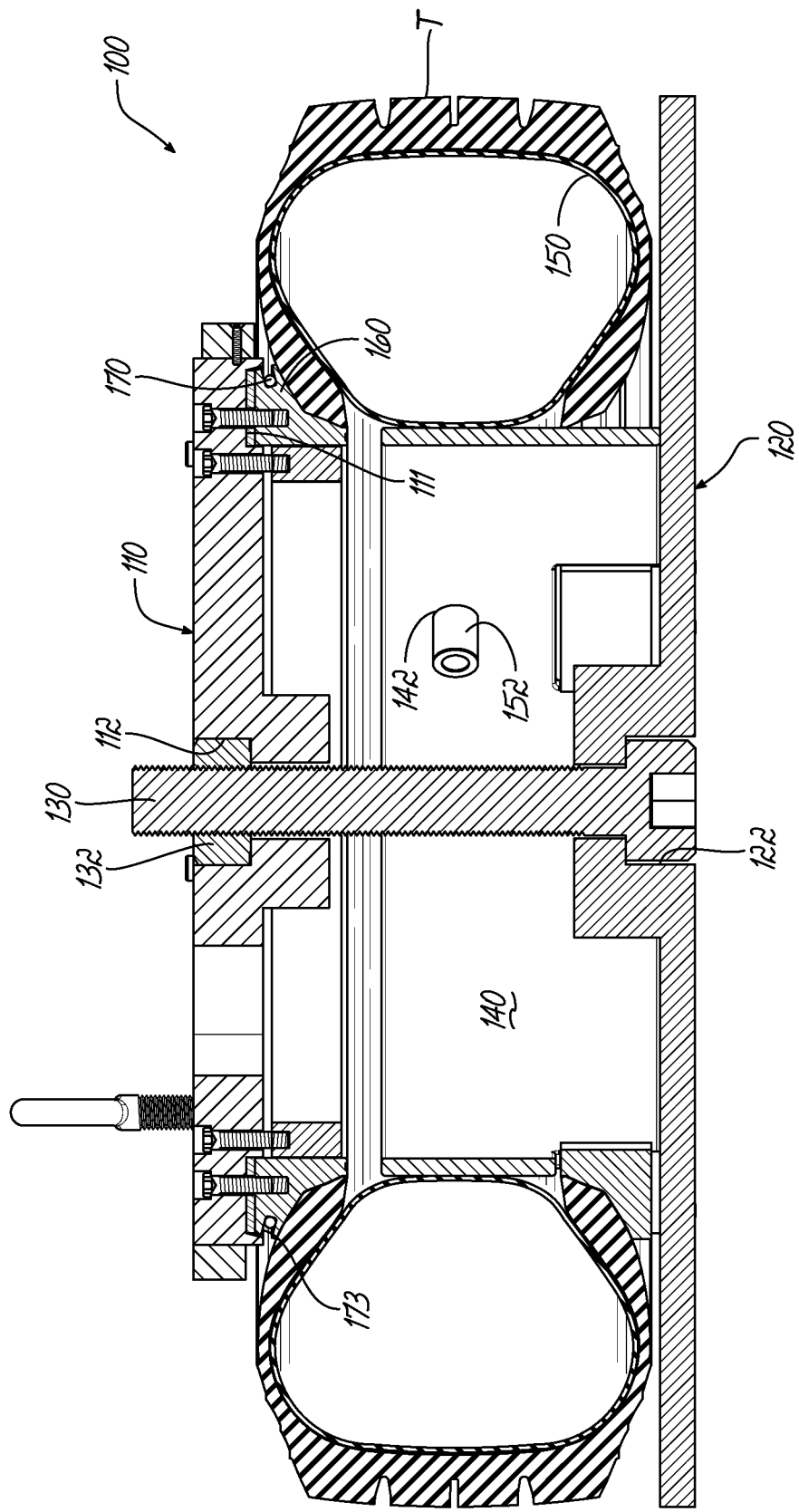
FIG. 3 is a cutaway perspective view of the tire and tire apparatus of FIG. 1.

As shown in FIGS. 1-2, the tire T is mounted onto the support plate 120. The tire bead is mounted on a plurality of optional lower bead supports 142, which are spaced apart. Alternatively, the optional lower bead support 142 may be a single annular ring (not shown). An optional annular support collar 140 is received within the interior of the tire. An inflatable inner tube 150 is received about the support collar 140. As shown in FIG. 3, the inflatable inner tube 150 has a valve 152 for inflating the inner tube with air. The valve 152 is positioned in a hole 142 of the support collar 140 for ease of access to inflate the inner tube 150. The inflatable inner tube 150 is positioned inside the tire cavity so that inflation of the inner tube results in inflation of the tire cavity.

Figure 4:
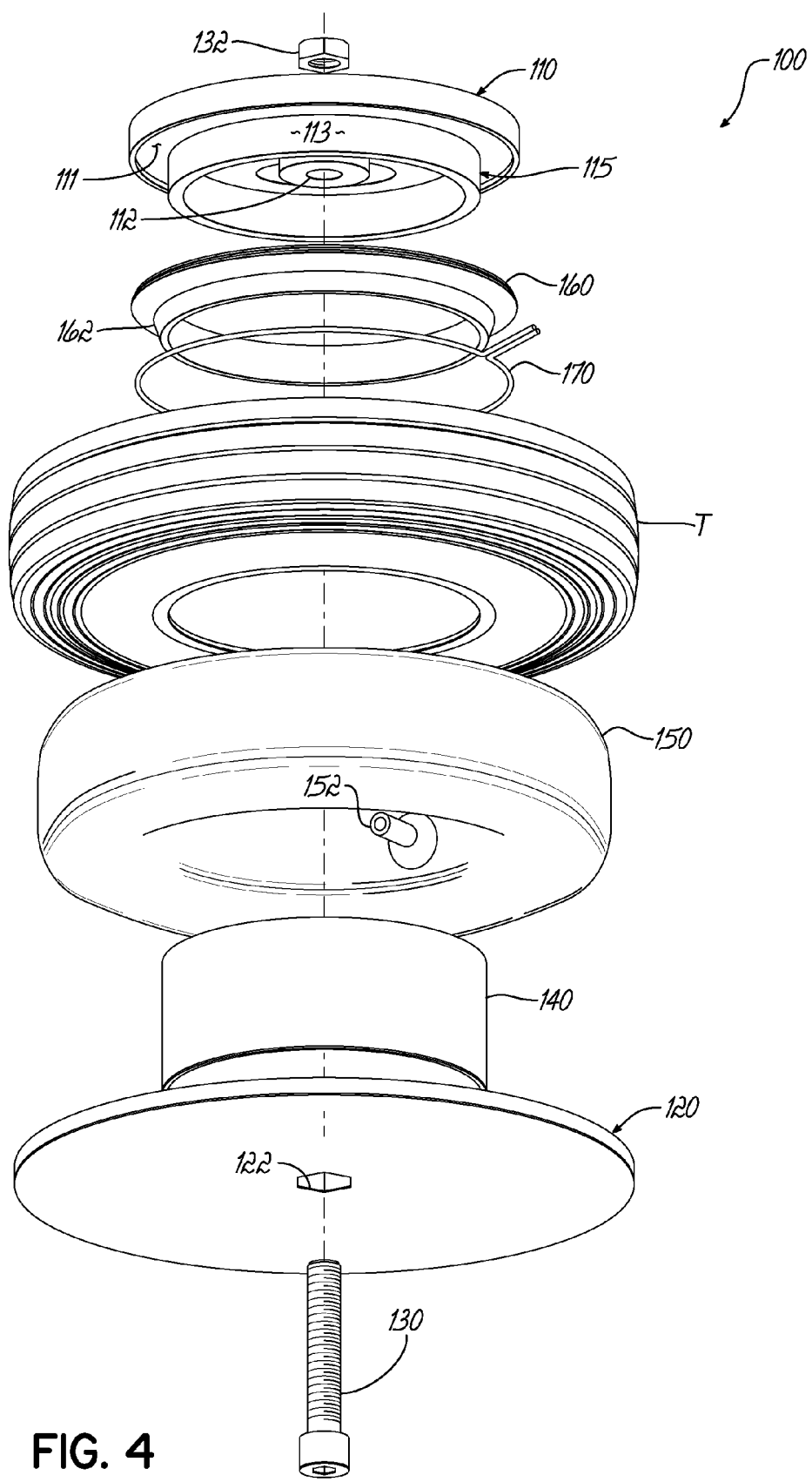
FIG. 4 is a is an exploded view of the tire and tire apparatus of FIG. 1.
Figure 5:
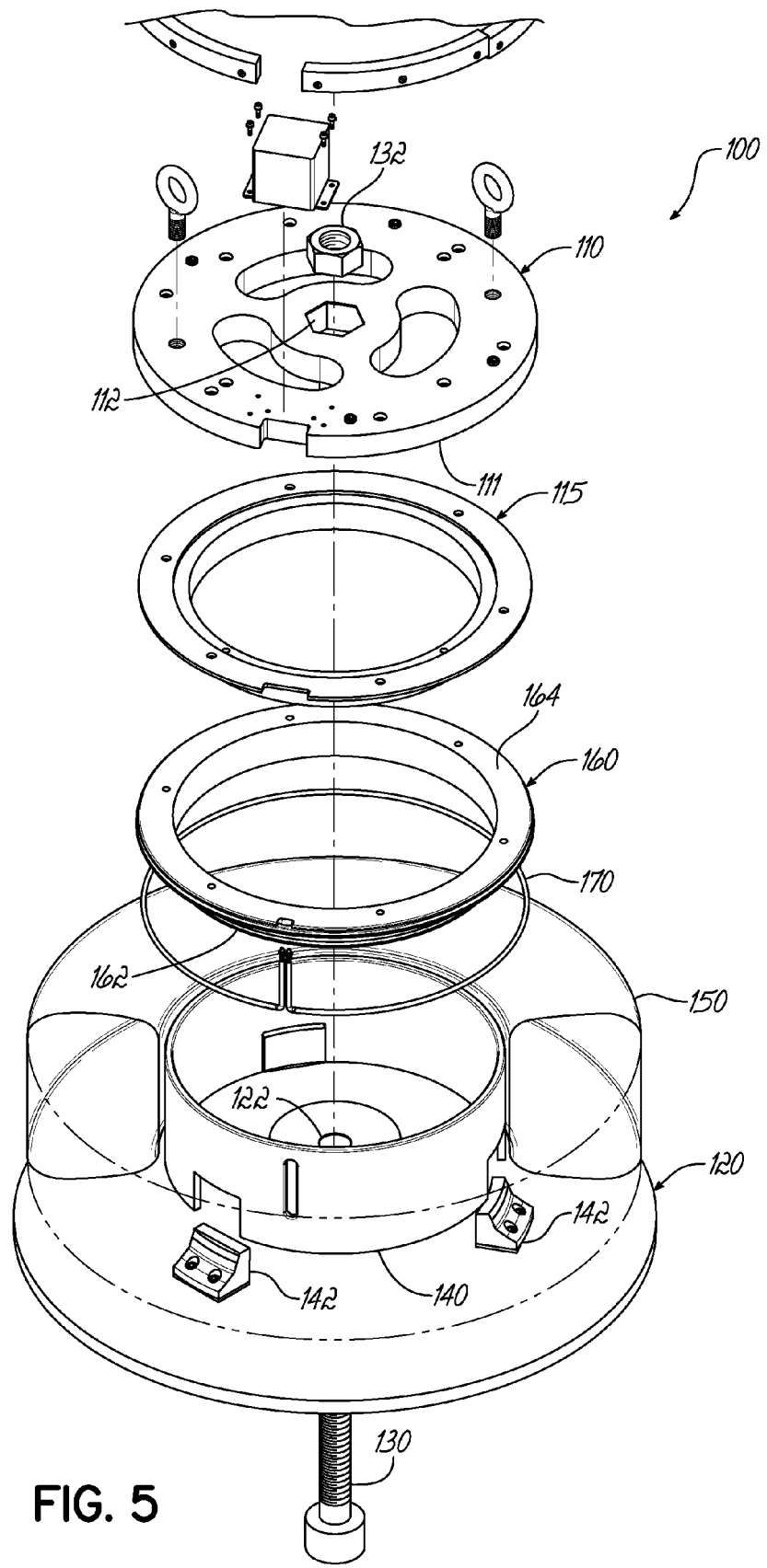
FIG. 5 is a is an exploded view of the tire apparatus shown without the tire.
Figure 6:
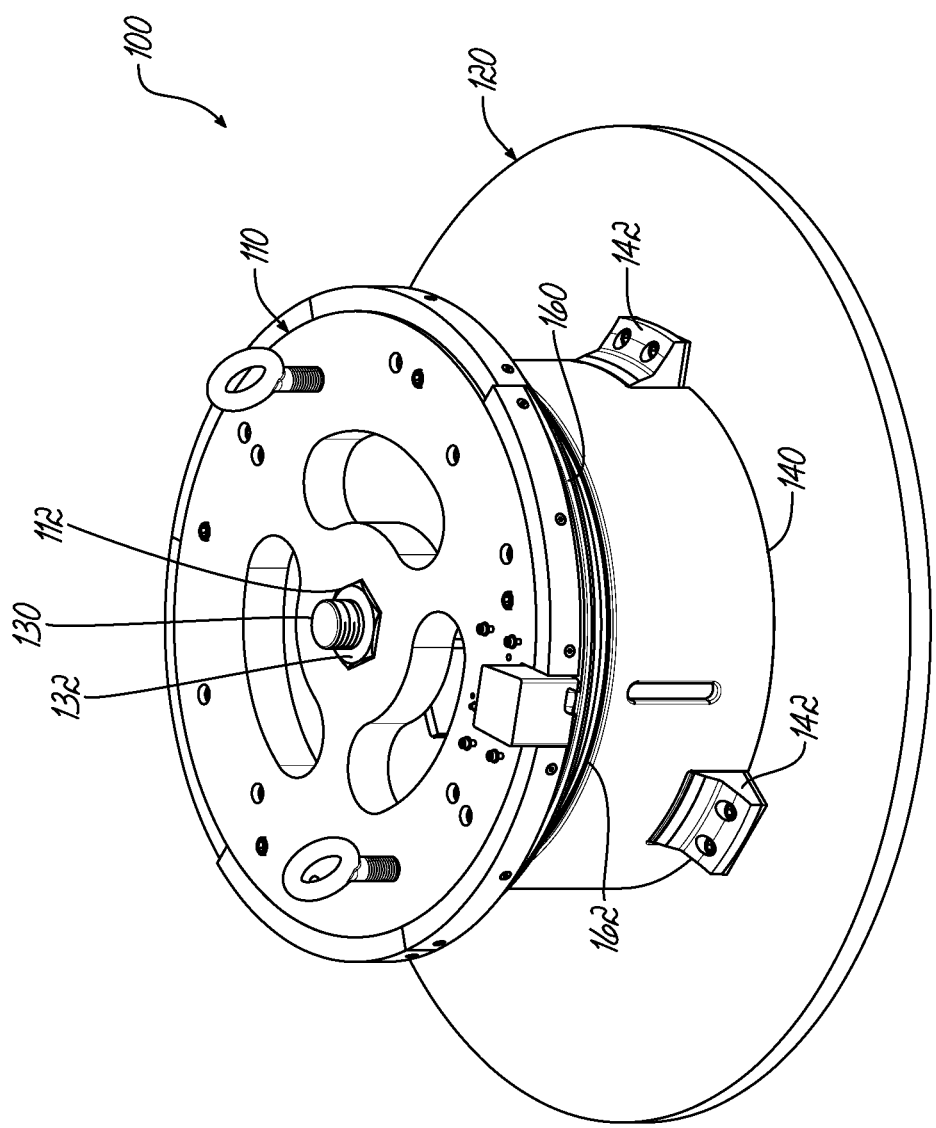
FIG. 6 is a side view of the tire apparatus.
Figure 7:
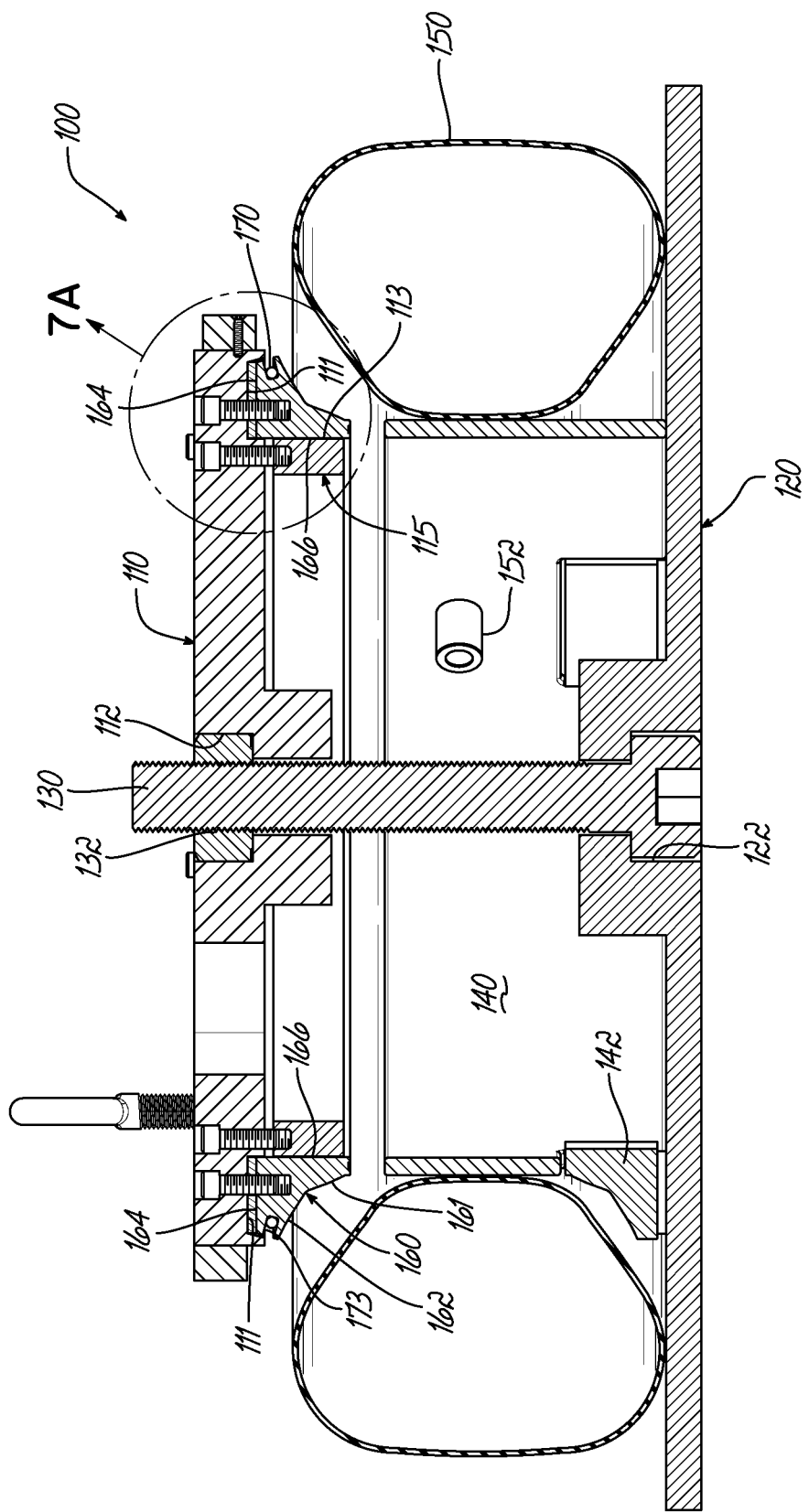
FIG. 7 is a cross-sectional side view of the tire apparatus.
Figure 7A:
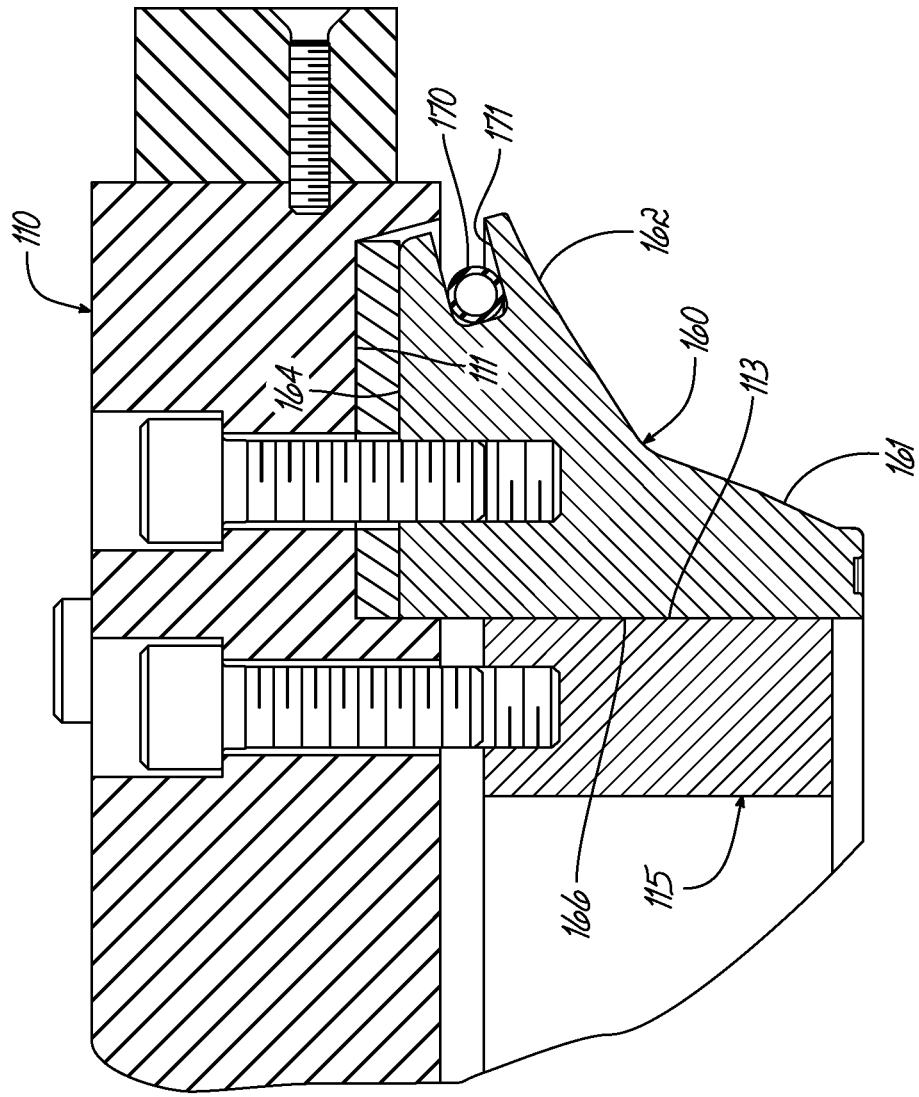
FIG. 7A is a close up view of the heated ring assembly.

FIG. 4 illustrates an exploded view of the tire apparatus 100 shown with the tire T. FIG. 5 illustrates an exploded view of the tire apparatus shown without the tire T. As shown in FIGS. 4 and 5, the tire apparatus 100 further includes a heated ring 160. The heated ring 160 has an upper face 164 that is secured to the lower surface 111 of the first plate 110. The heated ring 160 and the first plate 110 may be integrally formed in a one piece unit. The heated ring has an inner radial surface 166 that mates with the outer surface 113 of an optional support ring 115. The optional support ring may be integrally formed with the first plate 110 or may be bolted or secured to the first plate 110. As best shown in FIG. 2, the heated mold ring 160 has an inner lip 161 that seats against the bead region of the tire. A radially outer surface 162 seats against the lower sidewall region of the tire T. A heating element or tube 170, preferably annular in shape, is received in an annular groove 171 in the mold ring 160. Preferably, the annular tube 170 is located adjacent the radially outer surface 162. Alternatively, the radially outer surface 162 has an annular channel 173 for receiving the tube therein (not shown). The heated mold ring is used to cure the installed pump tube assembly as described, below.

Figure 8:
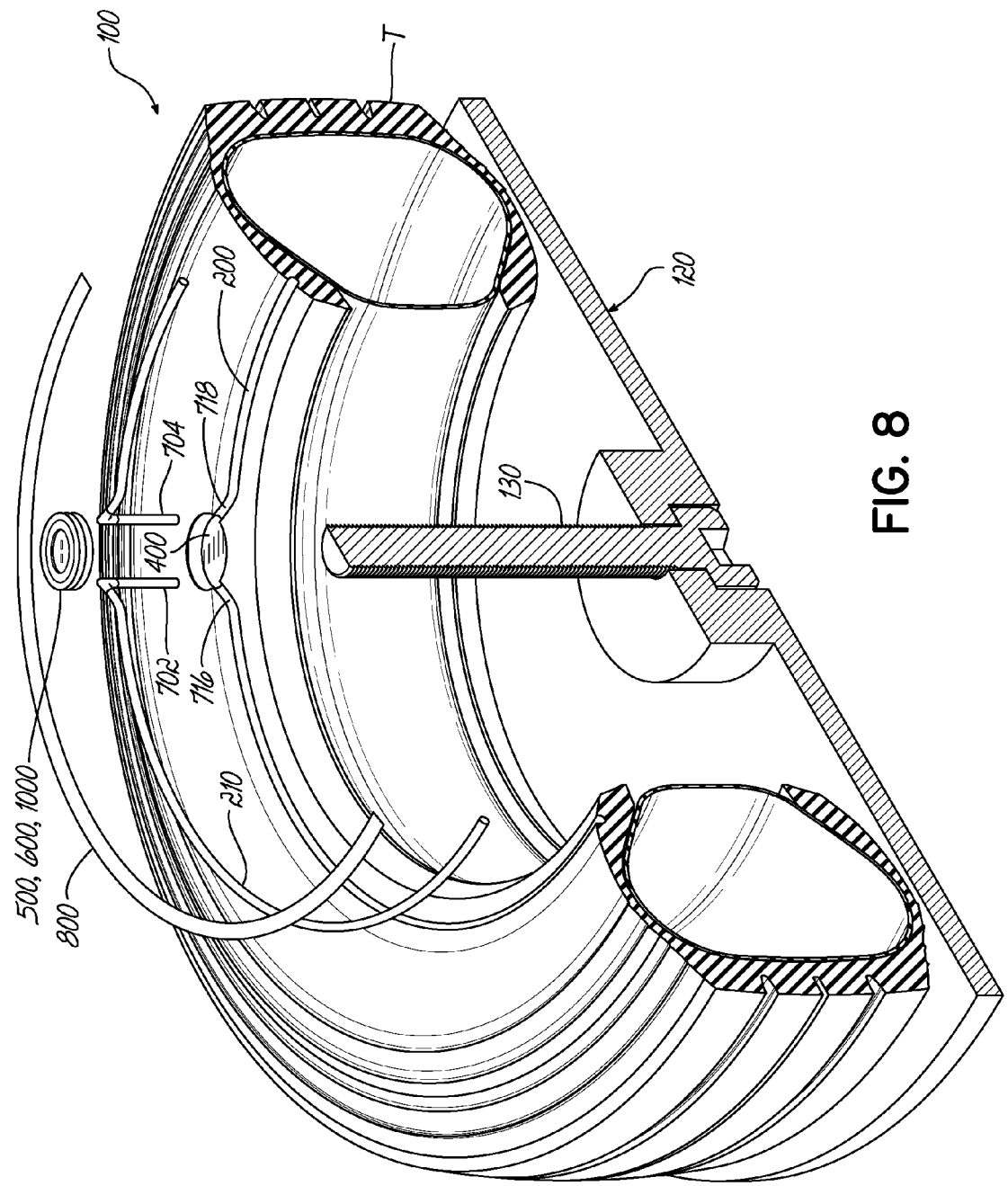
FIG. 8 is a cross-sectional side view of a tire mounted in the apparatus and configured to install a pump.

As shown in FIG. 8, the tire T may comprise a groove 200 that is preferably an annular groove. The groove may be located anywhere in the sidewall region of the tire, typically in the lower sidewall area near the bead region. The groove is adapted to receive self inflating tire components, such as pump tubing 210 installed in the groove and operable to pump air. The pump configuration may vary, and for example may be a 360 degree pump, or two 180 degree pumps, or a single 180 degree pump. The tire components may further include a valve or regulator mechanism and a filter mechanism, which may be two separate components or a one piece unit. There may be also additional components such as passage tubes which communicate air between the valve and filter components.

Figure 9:
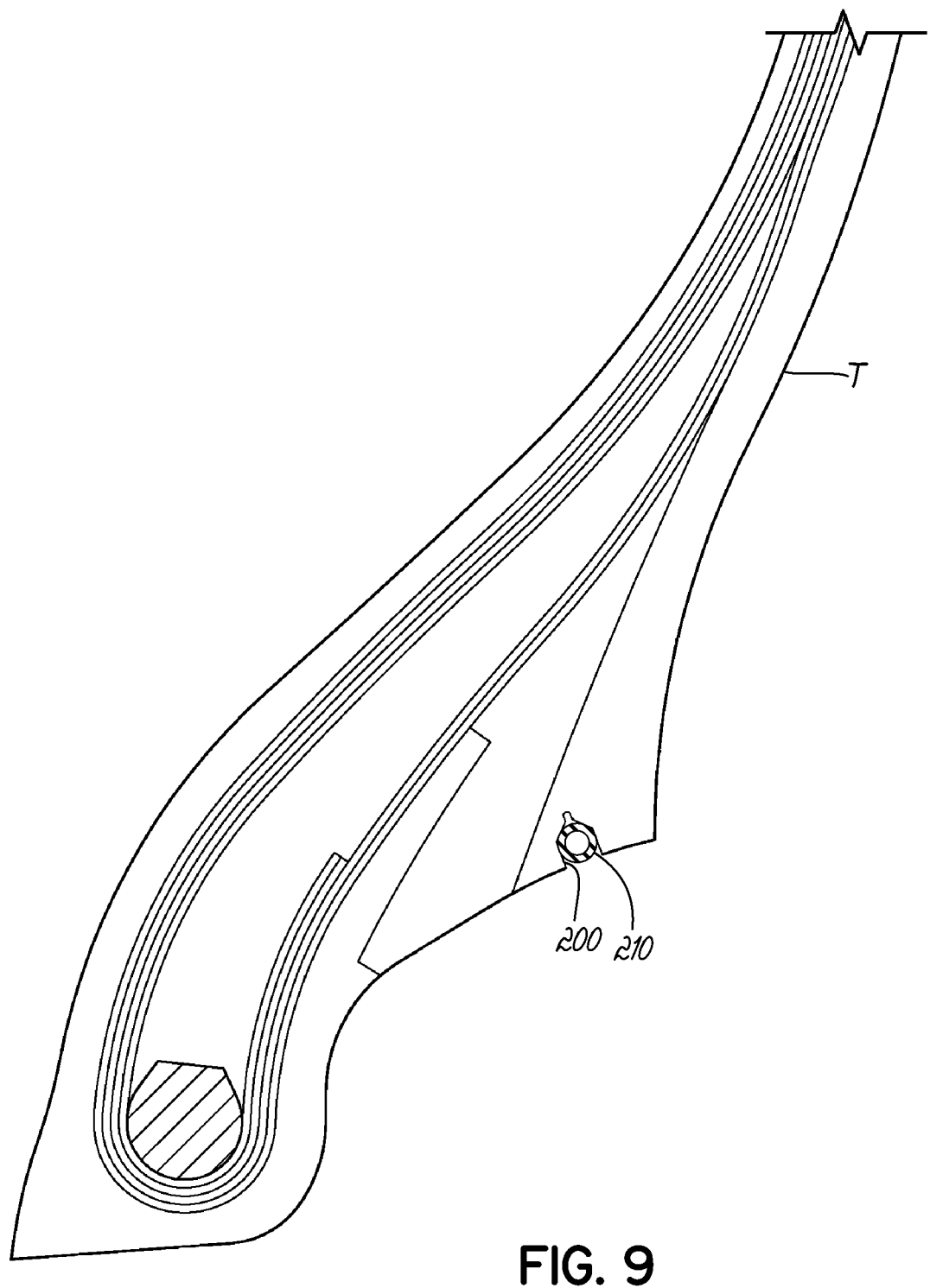
FIG. 9 is a cross-sectional view of tire bead area showing an installed pump tube in the groove.

FIG. 9 illustrates a cross-sectional view of a lower sidewall portion of a tire, illustrating the groove 200 and the pump tubing 210 installed in the groove 200. FIG. 9 is an illustration of the tire prior to application of a green cover strip and prior to curing the green cover strip.

Figure 11:
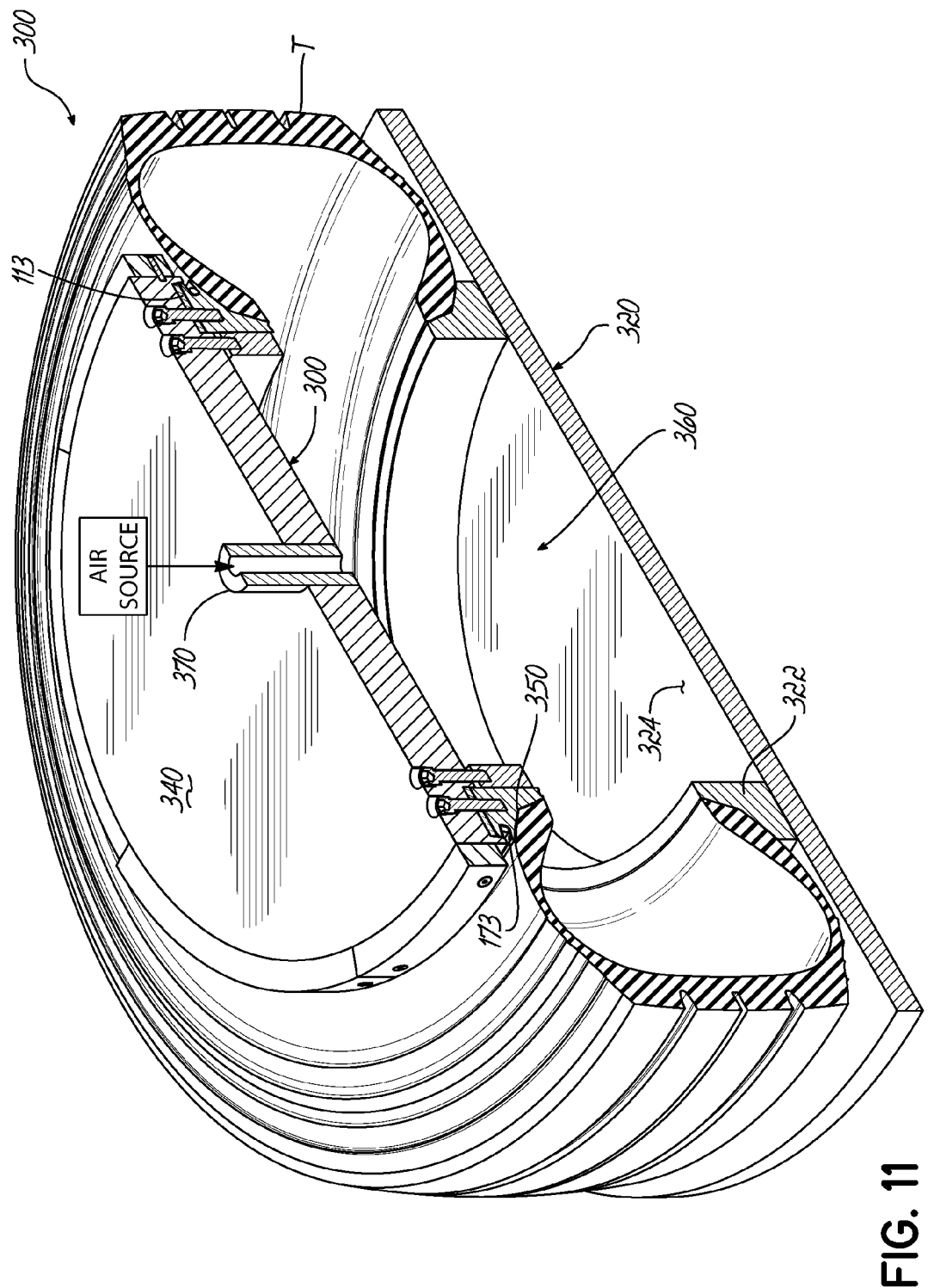
FIG. 11 is a cross-sectional view of a second embodiment of a tire apparatus of the present invention.

FIG. 11 illustrates an alternate embodiment of the tire apparatus 300 wherein the tire tube has been eliminated, and the support plate 320 and the first plate 340 function to seal the tire. The lower plate 320 has no holes. An annular support ring 322 is located on the upper surface 324 of the lower plate for supporting the tire bead. A second plate 340 is provided, and has an outer bead support ring 350 that is heated. The outer bead support ring 350, the annular support ring 322 together with the support plate 320 and first plate 340 provide a sealed cavity 360. The sealed cavity 360 may be inflated or deflated by pressurized fluid such as air into inlet port 370. Thus the inflatable tube may be eliminated.

Method Steps

In order to install the pump tubes 210 into the groove 200 of the tire T, the tire is placed upon the support plate 120 as shown in FIG. 8. The tire T is not mounted on a rim. The support collar 140 is placed in the tire center hole that would normally be occupied by the rim. The inflatable inner tube 150 is received about the support collar 140. The inner tube 150 is inserted into the tire cavity. The inner tube is inflated until the tire groove opens, typically about 5-15 psi.

While the groove is open, the groove is prepped for installation of the pump tubes 210. The groove may be optionally cleaned with an organic solvent or optionally cleaned by surface grinding or abrasion to ensure no release agents have contaminated the groove interior.

Next, a thin layer of rubber cement is applied to the walls of the groove.

Next, a filter assembly 500 may optionally be inserted into a pocket 400 molded into the desired area of the tire, typically near the lower sidewall bead area. In order to affix the filter assembly to the tire, the following steps are followed. First, the bottom and sides of the filter housing are buffed with abrasive material such as sandpaper. Next the bottom and sides of the filter housing are pretreated with Chemlock or other suitable adhesive. Preferably, the filter housing is placed in a mold and rubber is injection molded to enrobe the housing bottom and sides of the filter housing with rubber or elastomer. The type of rubber suitable for use is known to those skilled in the art as cushion gum, however any type of rubber would work. The coating of rubber 902 may be cured or partially cured about the housing.

Figure 10:
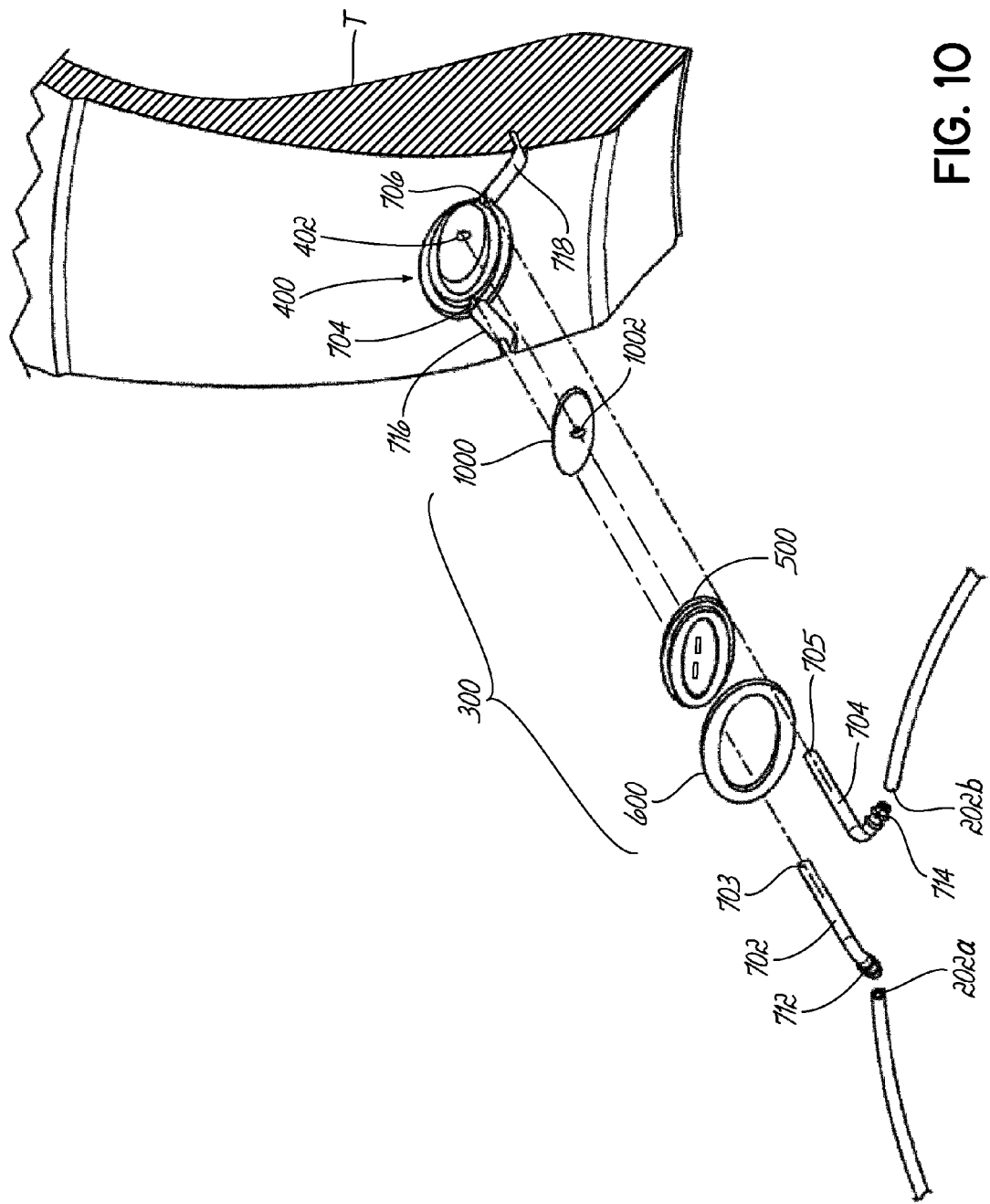
FIG. 10 is an exploded view of an exemplary filter assembly for installation into a exemplary filter pocket located in the tire sidewall area near the bead.

Next, the pocket bottom surface 401 is buffed. As shown in FIG. 10, a green rubber patch 1000 is used to secure the filter housing to the tire pocket bottom surface. The green rubber patch 1000 is buffed on both sides. The rubber patch 1000 is then coated with a suitable adhesive on both sides and then inserted onto the pocket bottom surface. The patch 1000 preferably has a hole 1002 that is aligned with hole 402 of pocket. One suitable adhesive is Fast Dry Self-vulcanizing Cement made by the Rubber Patch Company. The filter housing 500 is then inserted onto the rubber patch 1000, ensuring the holes 1002, 402 are aligned. Preferably, the filter housing bottom has a rubber coating which is first buffed, and then affixed to the rubber patch 1000. Alternatively, the pocket bottom surface 401 and filter housing bottom may be coated with a suitable adhesive, eliminating the need to coat both sides of the patch with a suitable adhesive. A green (unvulcanized) rubber ring 600 has an inner hole that is positioned about the outer circumference of the filter assembly 500 and wherein the outer portion of the rubber ring is around the tire surface surrounding the pocket. The green rubber ring 600 has an inner side which is coated with a suitable adhesive as described below.

Adjacent the pocket are two holes 704, 706 as shown in FIG. 10. The holes 704,706 extend through the sidewall of the tire and are in fluid communication with aligned holes (not shown) of a valve device or regulator. Valve connector tubes 702, 704 have a first end 703,705 that are inserted through holes 704, 706 and into the regulator or valve after being coated with adhesive (not shown). Valve connector tubes have second ends 712, 714 that are coated with adhesive, and then connected to the pump ends 202*a,b* and then inserted into grooves 716,718 formed adjacent the pocket. Grooves 716, 718 connect to groove 200.

After the pump passageway is connected to the second ends 712, 714 of the pump tubes, the pump tube is inserted into groove 200, so that the rubber cement coating is in contact with and between the tube and groove wall surface (e.g. in a manner for the rubber coating to contact and thereby communicate with the surfaces of both the tube and groove wall).

Next, adhesive is applied to a first side of a cover strip 800 of green rubber. The adhesive coated side of the cover strip is then applied over the groove. Preferably, the edges of the cover strip 800 mate with the tire surface surrounding the groove so that suitable adhesion may occur.

Next, the upper plate with the affixed heated mold ring is placed on the tire so that the inner lip of the mold ring is in contact with the groove and green cover strip, and the filter green rubber ring. Next, the upper plate is secured with the support bolt. Then, the inner tube is inflated to a pressure in the range of 5-10 psi to or a pressure sufficient to ensure sufficient contact pressure between the mold ring and the cover strip and green rubber ring. The heated mold ring is then heated to the desired temperature so that the filter housing, tube 210, valve connector tubes, green rubber ring and cover strip are heat cured for the required time necessary to cure the cover strip and green rubber ring.

After the tire assembly is cured, the upper plate is unlocked and the tire is removed from the assembly.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for making an air maintenance tire and pump assembly, comprising the steps of:
   a. providing a tire having a molded groove in a sidewall of the tire and a pocket in the sidewall and a cavity;
   b. inserting an inflatable tube assembly in the tire cavity;
   c. placing the tire and tube on a support plate;
   d. inflating the tube to open the molded groove in the sidewall,
   e. coating a green rubber patch with adhesive and inserting the green rubber patch into the pocket;
   f. affixing a filter housing bottom to the green rubber patch;
   g. coating the molded groove with adhesive and inserting a tube into the molded groove;
   h. inserting a green cover strip over the tube;
   i. deflating the tube assembly;
   j. placing an upper plate over the tire, wherein the upper plate has a ring having an inner lip that seats against the bead region of the tire and a radially outer surface seats against the lower sidewall region of the tire T; and
   k. heating the ring.

2. The method of claim 1 wherein the tire is uncured.

3. The method of claim 1 wherein the tire is cured.

4. A method for making an air maintenance tire and pump assembly, comprising the steps of:
   a. providing a tire having a molded groove in a sidewall of the tire and a cavity;
   b. inserting an inflatable tube assembly in the tire cavity;
   c. placing the tire and tube on a support plate;
   d. inflating the inflatable tube assembly to open the molded groove in the sidewall,
   e. coating the molded groove with adhesive and inserting a tube into the molded groove;
   f. inserting a green cover strip over the tube;
   g. deflating the inflatable tube assembly;
   h. placing an upper plate over the tire, wherein the upper plate has a ring having an inner lip that seats against the bead region of the tire and a radially outer surface seats against the lower sidewall region of the tire T; and
   i. heating the ring.

5. The method of claim 4 wherein the tire is uncured.

6. The method of claim 4 wherein the tire is cured.

7. A method for making an air maintenance tire and pump assembly, comprising the steps of:
   a. providing a tire having a molded groove in a sidewall of the tire;
   b. providing an upper support plate having an upper sealing ring and a lower support ring having a lower sealing ring, wherein the upper sealing ring has a ring for heating an area of the tire;
   c. positioning the tire between the upper support plate and the lower support plate so that each upper and lower support plate is in engagement with a respective bead;
   d. inflating the tire to open the molded groove in the sidewall,
   e. coating the molded groove with adhesive and inserting a tube into the molded groove;
   f. inserting a green cover strip over the tube;
   g. releasing some air from the tire; and
   h. heating the ring.

* * * * *